C. F. NOFTZ.
Shovel Plow.

No. 83,992.

Patented Nov. 10, 1868.

Witnesses
Jno. A. Morgan
Philip C. Dieterich

Inventor
C. F. Noftz
per Munn & Co.
Attys

CHARLES F. NOFTZ, OF TOLEDO, OHIO.

Letters Patent No. 83,992, dated November 10, 1868.

IMPROVEMENT IN POTATO AND CORN-PLOWS.

The Schedule referred to in these Letters Patent and making part of the same.

*To all whom it may concern:*

Be it known that I, CHARLES F. NOFTZ, of Toledo, in the county of Lucas, and State of Ohio, have invented a new and useful Improvement in Potato and Corn-Plows; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
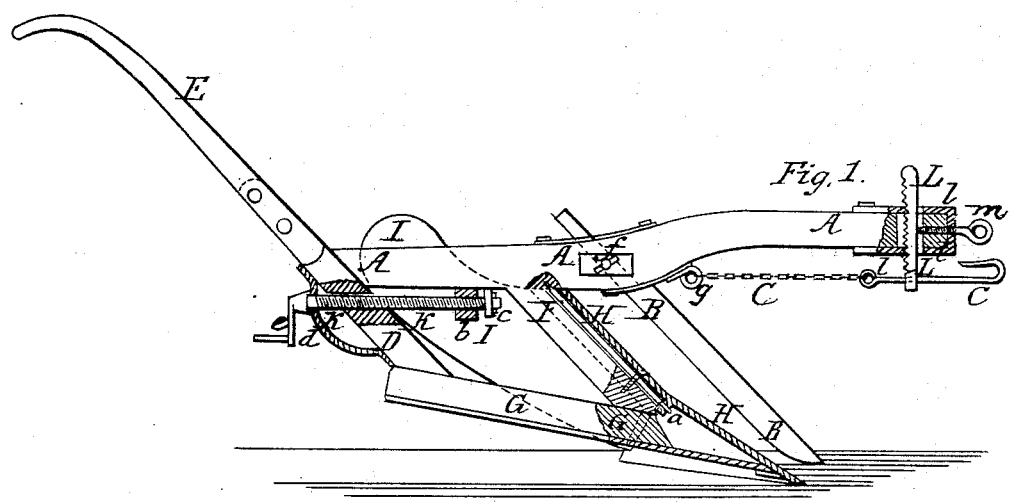
Figure 1 represents a side elevation, partly in section, of my improved plow.

The object of this invention is to construct a plow for cultivating corn, potatoes, rice, and other plants, which plow shall be of simple construction, cheap, durable, and adjustable to the width of furrows and height of rows.

The invention consists of such a general arrangement and combination of parts that the aforesaid object will be obtained; also, in the application of a screw and toggle-levers for adjusting the wings.

A, in the drawing, represents the plow-beam, which is somewhat curved, as shown, so that it will be broader at its bend, to give a better hold for the up-and-down adjustable coulter B, and a good place of attachment for the draught-chain C.

D is the rear standard, extending somewhat above the rear end of the plow-beam A, which it connects with the rear end of the inclined bar G.

E, E are the handles, attached by bolts to the upper or wedge-shaped end of the rear standard D.

F is the plow-standard projecting downward and forward from the plow-beam, in front of the handle, and behind the coulter, as shown. The plow-standard F is longer than the downward-projecting part of the handle, and their ends are connected by an inclined bar, G, as in fig. 1.

H is the main plowshare; the same in form of an arrow-head, and is attached to the standard F, covering the entire front of the same, as shown.

Figure 2:
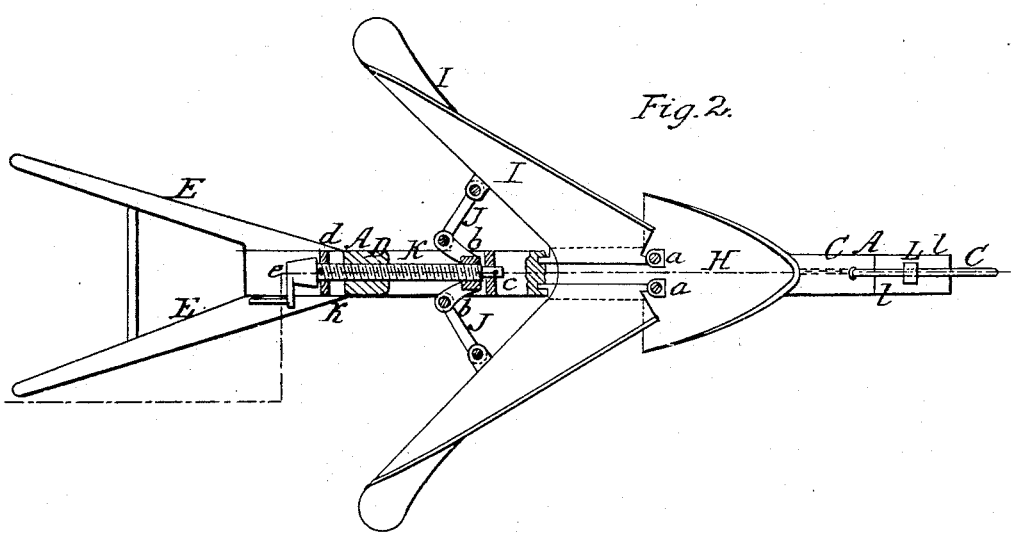
Figure 2 is an inverted plan view, partly in section, of the same.

I·I are the wings of the plow. They are pivoted to lugs *a*, projecting from the under side of the arrow-head H, and to the beam A, as shown in figs. 1 and 2. They are hollow on the outer side, and have their front edge covered by the share H, as shown.

They are in rear connected, by means of jointed levers J J, with a nut, *b*, which is supported by a screw, *k*, that is swivelled in a lug, *c*, projecting from A, and in a plate, *d*, projecting from D, as shown in fig. 1.

The screw is provided with a crank-handle, *l*, so that it can be readily turned. By turning the screw, the nut will be moved forward or backward, and will thereby expand or contract the jointed levers J J, so as to move the wings I I out or in, as may be desired, to throw the soil more or less far.

The coulter B is fitted through a slot of the beam A, and is up-and-down adjustable therein, being clamped in the desired position by means of a set-screw, *f*.

The draught-chain C is attached, near the middle of the beam, to a ring or staple, *g*, attached to the same, and passes in front through an eye formed on the lower end of an up-and-down adjustable plate, L.

This plate is notched on one side, and fits through a slot of the plow-beam. It can be locked at any desired height by means of a screw, *m*, in front, and by fitting with its notched edge over the edge of the perforated metallic cap *l* of the plow-beam.

By adjusting the bar L up or down, the draught will be raised or lowered, and the depth of the plow in the ground consequently regulated.

In this manner, a plow is produced which is adjustable for all kinds of soil, furrows, and ridges, and which will till the ground better than any other plow now used for the same purpose.

Having thus described my invention,

I claim as new, and desire to secure by Letters Patent—

1. The combination of the screw K, nut *b*, and jointed levers J J, for adjusting the position of the wings I I, substantially as and for the purpose herein shown and described.

2. A plow, consisting of the combination of the beam A, handle D, standard F, arrow-head share H, adjustable wings I I, adjustable coulter B, and adjustable draught-chain C, that works in the up-and-down adjustable notched plate L, all made, arranged, and operating substantially as and for the purpose herein shown and described.

CHARLES F. NOFTZ.

Witnesses:
 OTTO REIDEMEISTER,
 CHS. BUDEFELDT.